(12) United States Patent
Mori et al.

(10) Patent No.: US 6,287,624 B1
(45) Date of Patent: *Sep. 11, 2001

(54) FOODS CONTAINING FAT OR OIL

(75) Inventors: Hideki Mori; Takuya Watanabe, both of Ibaraki (JP)

(73) Assignee: Kao Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,593

(22) PCT Filed: Mar. 6, 1998

(86) PCT No.: PCT/JP98/00926

§ 371 Date: Sep. 13, 1999

§ 102(e) Date: Sep. 13, 1999

(87) PCT Pub. No.: WO98/39977

PCT Pub. Date: Sep. 17, 1998

(30) Foreign Application Priority Data

Mar. 12, 1997 (JP) .................................................. 9-057793

(51) Int. Cl.$^7$ .................................................. A23D 9/007
(52) U.S. Cl. .......................... 426/601; 426/602; 426/611
(58) Field of Search .................................. 426/601, 602, 426/611

(56) References Cited

U.S. PATENT DOCUMENTS

| 3,658,555 | * | 4/1972 | Menz ........................ 99/123 |
| 4,737,369 | * | 4/1988 | Asano ....................... 426/98 |
| 4,976,984 |   | 12/1990 | Yasukawa et al. . |
| 5,223,294 | * | 6/1993 | Takenawa ................. 426/329 |
| 5,879,735 | * | 3/1999 | Cain .......................... 426/603 |
| 5,912,042 | * | 6/1999 | Cain .......................... 426/607 |

FOREIGN PATENT DOCUMENTS

| 4-368325 | | 12/1992 | (JP) . |
| 5-168142 | | 7/1993 | (JP) . |
| 5-168412 | | 7/1993 | (JP) . |
| 8-269478 | * | 10/1996 | (JP) . |

* cited by examiner

Primary Examiner—Carolyn Paden
(74) Attorney, Agent, or Firm—Oblon, Spivak, McClelland, Maier & Neustadt, P.C.

(57) ABSTRACT

The invention provides foods containing diglycerides which upon ingestion into the body, are hardly accumulated as body fat, are utilizable more positively as energy. The diglycerides are excellent in the oxidation stability of oils and/or fats contained therein, and are excellent in eating-feeling such as in dissolution in the mouth. The foods of the invention comprise at least 0.5% by weight of a partial glyceride derived from a $C_{2-10}$ aliphatic acid.

5 Claims, No Drawings

FOODS CONTAINING FAT OR OIL

TECHNICAL FIELD

The present invention relates to a food containing oil and/or fat. In particular, the present invention provides foods, though which are ingested, which are hardly accumulated as body fat, are easily utilizable as energy, and contribute to the storage of stamina at the time of fatigue. Further, the present invention provides foods with excellence in the oxidation stability of oils and/or fats contained therein and excellent in eating-feeling such as dissolution in the mouth.

BACKGROUND ART

Humans take in a source of necessary energy mainly from sugars and lipids, but have surplus calories in the modern dietary habits under the present circumstances. In particular, lipids have high calorie value and are regarded as a factor for facilitating obesity upon surplus intake to cause adult diseases. However, there are few lipids which are effective in inhibiting the accumulation of body fat and in more positive utilization as energy and are excellent in stability and eating-feeling.

JP-A 8-60180 describes that a fat composition comprising diglycerides containing middle- and long-chain aliphatic groups has a weak but inhibitory effect on accumulation of body fat.

JP-A 5-168142 discloses a diglyceride containing two long-chain aliphatic groups and utilizes it as a bloom inhibitor for chocolate.

DISCLOSURE OF THE INVENTION

Focusing on the characteristics in metabolism of nutrition on oils and/or fats, the present inventors made extensive study for the purpose of providing foods containing oils and/or fats, in the case of which are ingested into the body, are hardly accumulated as body fat, are utilizable more positively as energy, contribute to the storage of glycogen in the liver and muscle to achieve effects such as recovery from fatigue, supplement of nutrition and increase of stamina at the time of exhaustion of physical strength, at the time of fatigue and at the time of exercise, are excellent in the oxidation stability of oils and/or fats contained therein, and are excellent in eating-feeling such as in dissolution in the mouth. As a result, the present inventors found that partial glycerides derived from specific middle- and short-chain aliphatic acids are advantageous oils and/or fats in that they are easily utilizable as energy as described above, their accumulation as body fat can be easily controlled, and further they are excellent in eating-feeling and oxidation stability, and the present invention was thereby completed.

The present invention relates to foods comprising at least 0.5% by weight of a partial glyceride derived from a $C_{2-10}$ aliphatic acid. The number of carbons of the aliphatic acid is preferably 8 to 10.

The partial glyceride is preferably a diglyceride. More preferably, at least one of the two aliphatic acids constituting the diglyceride is a $C_{8-10}$ aliphatic acid, or at least one of two aliphatic acids constituting the diglyceride is a $C_{10}$ aliphatic acid, or both of the two aliphatic acids constituting the diglyceride are $C_{8-10}$ aliphatic acids. The partial glyceride is preferably capric acid diglyceride.

The foods preferably comprise 0.5 to 85% by weight of the partial glyceride.

Other preferable foods are those wherein the partial glyceride is a diglyceride, at least one of two aliphatic acids constituting the diglyceride is a $C_{10}$ aliphatic acid, and at least 4.0% by weight of this partial glyceride is contained.

The foods are preferably in the form of drinks or oral administration agent.

Further, the present invention relates to foods having the whole or a part of oils and/or fats in the fat-containing foods replaced by a partial glyceride, wherein this partial glyceride is derived from a $C_{2-10}$ aliphatic acid and the content of this partial glyceride in foods is particularly at least 0.5% by weight for oral administration.

Those who take in the foods of the present invention are supplemented with energy. Further, accumulation of body fat is inhibited in those who have taken in the foods. The partial glyceride is easily consumed as energy, and hardly accumulated in internal organs and adipose tissues. That is, glycogen is not consumed and readily stored. Accordingly, storage of glycogen is improved. This effect is more significant particularly, if at least 0.5% by weight of oil and/or fat contained in the foods is substituted by the partial glyceride.

When the foods of the present invention are ingested, as compared with no ingestion of the foods, fats other than glycogen are predominantly consumed thereby significantly reducing the decrease of glycogen.

In the view of the significant effect, besides the above-mentioned action and effect, it is suggested that the partial glyceride may inhibit the accumulation of other oils and/or fats (adiposes) in internal organs or adipose tissues, or may promote the consumption of accumulated fats.

DETAILED DESCRIPTION OF THE INVENTION

Hereinafter, the present invention is described in detail.

In the present invention, the partial glyceride includes monoglycerides and diglycerides. However, $C_{2-10}$ monoglycerides usually taste bitter etc. It may be necessary, when the $C_{2-10}$ monoglyceride is used as foods, that they should be formed into foods making use of the flavor or that they should be used in combination with a masking agent for flavor. On the other hand, diglycerides taste less bitter, so they can be applied to a wide variety of foods, and for this reason, the foods preferably contain a large amount of diglycerides rather than a large amount of monoglycerides.

The aliphatic acid mentioned above is a $C_{2-10}$ aliphatic acids such as acetic acid, butyric acid, caproic acid, caprylic acid and capric acid. If the number of carbon atoms therein is low, peculiar flavor tends to be generated. Therefore the peculiar flavor needs a masking agent or needs a suitable foods for its unique flavor. And then, $C_{8-10}$ aliphatic acids with weak flavor are more preferable because of application to a wide variety of foods. Particularly, one of the two aliphatic acids of the diglyceride is preferably a $C_{8-10}$ aliphatic acid, especially preferably a $C_{10}$ aliphatic acid, and both of them are more preferably $C_{8-10}$ aliphatic acids and most preferably $C_{10}$ capric acid diglyceride.

The foods referred to in the present invention are the modes of foods containing oils and/or fats, which are ready to be eaten. The content of the partial glyceride in the foods is 0.5% by weight or more, preferably 1% by weight or more, more preferably 2% by weight or more, most preferably 4% by weight or more, as compared with the foods. That is, comparatively high calorie foods containing at least 0.5% by weight of oils and/or fats are significant in the effect of the present invention.

Ingredients other than the partial glyceride used in the present foods may be any ingredients being usable for food.

Examples of the present foods include baked confectionery such as cookies and biscuits, fried cakes such as potato chips, cakes, ice creams, meats such as sausages and hamburgers, stews, fried foods such as fries and tempuras, and drinks such as juices and nutrition drinks. Further, the foods maybe creaming powder etc. insofar as the foods are placed in coffee or tea and contained in a necessary amount. Similarly, they may be dressings and mayonnaise on vegetables etc. satisfying a necessary amount in use, or margarine and fat spreads on breads etc. satisfying a necessary amount in use.

The foods of the present invention, into which the partial glyceride has been incorporated, are hardly accumulated as body fat and are easily converted into energy very rapidly. Further, it is believed that because this action is preferentially brought about, the foods also contribute to e.g. the maintenance of stamina by keeping glycogen in the liver and muscle. Accordingly, the foods are very effective in supplement of nutrition, recovery from fatigue and increase of stamina at the time of fatigue, at the time of reduction of physical strength, and before, during and after exercise.

The foods of the present invention are preferably in the form of an oral administration. The preparation form includes e.g. tablets, capsules, powder, granules and syrups. For their manufacturing, conventional excipients, disintegrators, binders, lubricants, pigments, diluents and so on are used. The excipients include glucose, lactose etc.; the disintegrators include starch, sodium alginate etc.; the lubricants include magnesium stearate, paraffin sulfate, talk etc.; and the binders include dimethylcellulose, gelatin, polyvinyl pyrrolidone etc.

EXAMPLES

Hereinafter, the effect of the present invention is described in more detail with reference to the Examples, which however are not intended to limit the present invention. The term "%" in the Examples refer to "% by weight" unless otherwise specified.

[Preparation of Oils and/or Fats]

Capric acid and glycerol were mixed at a molar ratio of 2:1 in the presence of a catalyst, that is, a commercial lipase preparation of immobilized 1,3-position-selective lipase (Lipoyme 3A™ provided by Novo Industry A.S.), and the mixture was reacted at 40° C. under reduced pressure. The lipase preparation was filtered out, and the final product was subjected to molecular distillation and purified for discoloration, deodorization etc. to give an oil and/or fat consisting of 85% diglyceride and 15% triglyceride (oil and/or fat preparation A).

Rapeseed oil-decomposed aliphatic acids were used and treated in the same manner as above to give an oil and/or fat consisting of 86% diglyceride and 14% triglyceride (oil and/or fat preparation B).

In addition, 1 mole of capric acid was added to 1 mole of oleic acid monoglyceride (O-95R provided by Kao Corporation) and was reacted at 60° C. under reduced pressure in the presence of the above lipase preparation as the catalyst. After the lipase preparation was filtered out, the final reaction product was subjected to molecular distillation, and the monoglyceride, aliphatic acid, capric acid-capric acid diglyceride components were removed as much as possible and then purified for discoloration and deodorization to give a fat consisting of 80.9% diglyceride (0.5% capric acid-capric acid diglyceride, 50% capric acid-oleic acid diglyceride, and 30% oleic acid-oleic acid diglyceride) and 19.1% triglyceride (oil and/or fat preparation C).

Further, capric acid, palmitic acid and glycerol were mixed at a molar ratio of 1:1:1 and reacted at 60° C. under reduced pressure in the presence of the above lipase preparation as the catalyst. After the lipase preparation was filtered out, the final reaction product was subjected to molecular distillation, and the monoglyceride, aliphatic acid, capric acid-capric acid diglyceride components were removed as much as possible and purified for discoloration and deodorization to give a fat consisting of 80.8% diglyceride (0.5% capric acid-capric acid diglyceride, 51% capric acid-palmitic acid diglyceride, and 29% palmitic acid-palmitic acid diglyceride) and 19.2% triglyceride (oil and/or fat preparation D).

Further, capric acid, caproic acid and glycerol were mixed at a molar ratio of 1:1:1 and reacted at 60° C. under reduced pressure in the presence of the above lipase preparation as the catalyst. After the lipase preparation was filtered out, the final reaction product was subjected to molecular distillation and purified for discoloration and deodorization to give an oil and/or-fat consisting of 1.1% monoglyceride, 84.6% diglyceride (26.5% capric acid-capric acid diglyceride, 42.3% capric acid-caproic acid diglyceride, and 15.8% caproic acid-caproic acid diglyceride) and 14.3% triglyceride (oil and/or fat preparation E).

The glyceride composition and aliphatic acid composition in each oil and/or fat were analyzed in the following manner.

Measurement of Glyceride Composition Distribution

After the oil and/or fat was silylated with a silylating agent (silylating agent TH provided by Kanto Kagaku Co., Ltd.). It was analyzed by gas chromatography with a hydrogen ion flame detector, equipped with a capillary column (e.g. DBTM-1, J&W Co., Ltd.), and the glyceride composition distribution in the oil and/or fat was determined from the retention time and peak area ratio in the obtained chart.

Measurement of Aliphatic Acid Composition

Analyzed by gas chromatography according to a method in "2.4.20.2-77 Process for Preparing Fatty Acid Methyl Esters" and "2.4.21.2-73 Composition of Aliphatic Acids" in "Standard Methods for the Analysis of Fats, Oil and Related Materials, compiled by Japan Oil Chemists' Society". The distribution of aliphatic acids was determined from the retention time and peak area ratio in the obtained chart.

The oil and/or fat compositions used are shown in Table 1.

Example 1

Oil and/or fat preparations A, B, C and D to which 600 ppm tocopherol was added were examined for their oxidation stability and solubilization in the mouth. Oxidation stability was examined at 120° C. according to "2.4.28 Stability Test toward Autoxidation, 2.4.28.2-93 CDM Test" in "Standard Test Methods for Oil and Fat Analysis, compiled by Japan Oil Chemical Association". The results are shown in Table 2.

From the results described above, the oil and/or fat preparation A was more excellent in oxidation stability than the oil and/or fat preparations B and C. Further, its dissolution in the mouth is excellent, so it was found that the oil and/or fat preparation A is a general-purpose oil and/or fat being easily applicable to a wide variety of foods.

Example 2

Eight 6-week-old SD strain rats were reared for 3 weeks on each feed shown in Table 3. The change in body weight during the experiment and the change in the degree of body fat on Day 21 are shown in Table 4. Further, triglyceride levels in serum after the animals were sacrificed are shown in Table 5.

As compared with other oil and/or fat feed groups, the oil and/or fat 1 feed group is significantly low in triglyceride levels in serum. It is understood that because the degree of body fat also indicates a similar result, accumulation of the fat in internal organs and adipose tissues is low given the feed using oil and/or fat 1.

Example 3

Eight 6-week-old SD strain rats were reared for 3 weeks on each feed shown in Table 6. The rats were allowed to run on a tread mill for 30 minutes once a day from the 14th day of rearing.

The change in body weight during the experiment, the change in the degree of body fat on Day 21, and the duration of running motility on the tread mill are shown in Table 7. Further, triglyceride levels in serum after the animals were sacrificed are shown in Table 8.

TABLE 1

|  | Oil and/or fat preparation A | Oil and/or fat preparation B | Oil and/or fat preparation C | Oil and/or fat preparation D | Oil and/or fat preparation E | Rapeseed oil | MCT |
| --- | --- | --- | --- | --- | --- | --- | --- |
| Triglyceride | 15% | 14% | 19.1% | 19.2% | 14.3% | 98% | 100% |
| Diglyceride | 85% | 86% | 80.9% | 80.8% | 84.6% | 2% | tr |
| Monoglyceride | tr | Tr | tr | tr | 1.1% | tr | tr |
| Caproic acid | tr | Tr | tr | tr | 37 | tr | 1 |
| Caprylic acid | tr | Tr | tr | tr | tr | tr | 1 |
| Capric acid | 100 | Tr | 27 | 29 | 63 | tr | 99 |
| Palmitic acid | tr | 4 | tr | 71 | tr | 4 | tr |
| Stearic acid | tr | 2 | tr | tr | tr | 2 | tr |
| Oleic acid | tr | 59 | 73 | tr | tr | 59 | tr |
| Linoleic acid | tr | 20 | tr | tr | tr | 21 | tr |
| Linolenic acid | tr | 10 | tr | tr | tr | 9 | tr |

TABLE 2

|  | Oil and/or fat preparation A | Oil and/or fat preparation B | Oil and/or fat preparation C | Oil and/or fat preparation D |
| --- | --- | --- | --- | --- |
| CDM | 60 hr or more | 5.2 hr | 8.1 hr | 60 hr or more |
| Dissolution in mouth | excellent | excellent (liquid) | excellent | poor |

TABLE 3

| Oil and/or fat (one) of the 4 kinds described below) | 10% | Oil and/or fat 1: Oil and/or fat preparation A |
| --- | --- | --- |
|  |  | Oil and/or fat 2: Oil and/or fat preparation B |
|  |  | Oil and/or fat 3: Oil and/or fat preparation C |
|  |  | Oil and/or fat 4: Rapeseed oil |
| Casein | 20% |  |
| Mineral | 3.5% |  |
| Cellulose | 4% |  |
| Vitamin | 1% |  |
| Potato starch | 61.5% |  |
| Total | 100.0% |  |

TABLE 4

| Rearing period | Oil and/or fat 1 | Oil and/or fat 2 | Oil and/or fat 3 | Oil and/or fat 4 |
| --- | --- | --- | --- | --- |
| Day 0 (body weight: g) | 213.4 ± 3.5 | 213.0 ± 6.7 | 214.2 ± 2.9 | 211.8 ± 3.9 |

TABLE 4-continued

| Rearing period | Oil and/or fat 1 | Oil and/or fat 2 | Oil and/or fat 3 | Oil and/or fat 4 |
| --- | --- | --- | --- | --- |
| Day 14 (body weight: g) | 311.8 ± 6.1 | 355.2 ± 9.0 | 341.5 ± 3.6 | 371.0 ± 5.5 |
| Day 21 (body weight: g) | 337.2 ± 6.2 | 385.4 ± 8.5 | 363.0 ± 7.1 | 400.1 ± 9.2 |
| Degree of body fat (%: Day 21) | 9.3 ± 1.1 | 15.5 ± 2.1 | 12.5 ± 1.1 | 18.4 ± 1.7 |

TABLE 5

| Rearing period of 21 days | Oil and/or fat 1 | Oil and/or fat 2 | Oil and/or fat 3 | Oil and/or fat 4 |
| --- | --- | --- | --- | --- |
| Serum triglyceride mg/ml serum | 0.72 ± 0.25 | 1.40 ± 0.21 | 1.21 ± 0.19 | 2.21 ± 0.14 |

TABLE 6

| Oil and/or fat (one of the 4 kinds described below) | 10% |
| --- | --- |
| Casein | 20% |
| Mineral | 3.5% |
| Cellulose | 4% |
| Vitamin | 1% |
| Potato starch | 61.5% |
| Total | 100.0% |

Oil and/or fat 5: Oil and/or fat composition consisting of 59% oil and/or fat preparation A and 41% rapeseed oil (50% capric acid diglyceride).

Oil and/or fat 6: Oil and/or fat composition consisting of 58% oil and/or fat preparation B and 42% rapeseed oil (50% diglyceride derived from rapeseed aliphatic acid)

Oil and/or composition consisting of 58% and/or fat preparation and 38% rapeseed oil (50% capric acid-oleic acid diglyceride).

Oil and/or fat 8: Oil and/or fat composition consisting of 50% MCT and 50% rapeseed oil (50% capric acid triglyceride).

TABLE 7

| Rearing period | Oil and/or fat 5 | Oil and/or fat 6 | Oil and/or fat 7 | Oil and/or fat 8 |
|---|---|---|---|---|
| Day 0 (body weight: g) | 210.0 ± 3.9 | 211.5 ± 4.2 | 211.8 ± 3.0 | 212.5 ± 6.8 |
| Day 14 (body weight: g) | 323.0 ± 6.5 | 351.2 ± 5.3 | 339.1 ± 4.3 | 345.0 ± 8.9 |
| Day 21 (body weight: g) | 348.0 ± 6.1 | 375.3 ± 9.6 | 359.0 ± 6.7 | 368.5 ± 11.5 |
| Degree of body fat (%: Day 21) | 12.8 ± 1.1 | 18.9 ± 1.2 | 14.0 ± 0.6 | 15.3 ± 0.4 |
| Duration of motility (min) | 41.0 ± 2.9 | 32.3 ± 3.2 | 36.5 ± 1.5 | 28.5 ± 2.1 |

TABLE 8

| Rearing period of 21 days | Oil and/or fat 5 | Oil and/or fat 6 | Oil and/or fat 7 | Oil and/or fat 8 |
|---|---|---|---|---|
| Serum triglyceride mg/ml serum | 0.76 ± 0.09 | 1.43 ± 0.20 | 0.96 ± 0.09 | 1.26 ± 0.10 |

From the results described above, the duration of motility in the oil and/or fat 5 feed group was improved as compared with the other oil and/or fat feed groups. Further, the oil and/or fat 5 feed group indicated lower degrees of body fat than in the other oil and/or fat feed groups. From the foregoing, it was found that the feed using the oil and/or fat of the present invention is converted very easily into energy and hardly accumulated as body fat.

Example 4

Now, an example of application to drink is illustrated. Oil and/or fat preparation A with the formulation shown in Table 9 was emulsified to prepare a drink.

As a result, it was found that its emulsification stability is high and the drink can be used without any particular problem with the flavor.

Example 5

Now, an example of application to a wheat flour product is illustrated. Oil and/or fat preparation A with the formulation shown in Table 10 was baked in a usual manner to produce cookies.

As a result, it was found that the cookies are excellent in flavor and also in releasability after baking, so the oil and/or fat can be used as an equivalent to conventional oils and/or fats.

Example 6

Now, an example of application to whip cream is shown. An oily phase (oily ingredient liquid) and an aqueous phase (aqueous ingredient liquid) were prepared respectively according to the formulation shown in Table 11, mixed and preliminarily emulsified. Then, the resulting preliminarily mixture was homogenized at 60° C. in a homogenizer. Then, the resulting emulsion was sterilized in an UHT sterilizer (145° C., 3 seconds, Iwai Kikai Kogyo Co., Ltd.) and aseptically homogenized again at 70° C. in the homogenizer. The resulting emulsion was cooled to 15° C., followed by filling and subsequent aging for 1 day. The resulting emulsion was further whipped in a vertical whip machine (Kanto Kongoki Kogyo Co., Ltd.), to prepare a whip cream.

As a result, it was found that the whip cream is excellent in shape retention, flavor and eating-feeling in the mouth and the oil and/or fat can be used as an equivalent to conventional oil and/or fats.

TABLE 9

| Ingredients | Ratio in food composition (%) |
|---|---|
| Oil and/or fat preparation A | 20.0 |
| Powdered skim milk | 3.5 |
| Protein (casein) | 3.5 |
| Yolk lecithin | 0.7 |
| Fructose | 10.0 |
| L-valine | 0.5 |
| L-leucine | 0.5 |
| L-isoleucine | 0.5 |
| L-arginine | 0.5 |
| Citric acid | 0.1 |
| Ascorbic acid | 0.1 |
| Perfume | 0.1 |
| Water | 60.0 |
| Total | 100.0 |

TABLE 10

| Ingredient | Weight in food composition (g) |
|---|---|
| Oil and/or fat preparation A | 15.0 |
| Corn starch | 20.0 |
| Wheat flour | 50.0 |
| Butter | 5.0 |
| Fructose | 15.0 |
| Common salt | 0.5 |
| L-valine | 5.0 |
| L-leucine | 5.0 |
| L-isoleucine | 5.0 |
| L-arginine | 5.0 |
| Sodium bicarbonate | 0.5 |
| Water | 10.0 |

Example 7

Now, an example of application to a cocoa drink is illustrated. The composition shown in Table 12 was mixed and homogenized at 70° C. in a homogenizer to prepare a cocoa drink.

As a result, it was found that the cocoa drink tastes suitably bitter, and there is no particular problem with its emulsified state, and the oil and/or fat can be used as an equivalent to conventional oils and/or fats.

Example 8

A commercial gelatin capsule No. 2 (weight: 53.3 mg) was charged with 150 mg of oil and/or fat composition A or E, to prepare hard capsules in a usual manner.

Example 9

Soft capsule shells were charged in a usual manner with 500 mg of oil and/or fat composition A or E, to prepare hard capsules.

TABLE 11

| | Ingredients | Weight ratio in food composition |
|---|---|---|
| Oily phase | Oil and/or fat preparation A | 4.8 |
| | Palm kernel hydrogenated oil (IV = 2) | 17.2 |
| | Stearic acid monoglyceride (T-95, Kao Corporation) | 0.1 |
| | Oleic acid monoglyceride (O-95R, Kao Corporation) | 0.1 |
| Aqueous phase | Water | 15 |
| | Hydrous crystalline glucose (Showa Sangyo Co., Ltd.) | 10 |
| | Sunmalto S (Hayashibara Co., Ltd.) | 20 |
| | Oilgotose (liquid) (Sanwa Denpun Kogyo Co., Ltd.) | 28 |
| | Powdered skim milk (3% water content, 50% lactose) | 4.5 |
| | Sucrose fatty acid ester (DK ester F-110, Daiichi Kogyo Seiyaku) | 0.2 |
| | Sodium hexametaphosphate | 0.1 |

TABLE 12

| Ingredients | Ratio in food composition (%) |
|---|---|
| Oil and/or fat preparation E | 4.8 |
| Powdered skim miik | 3.5 |
| Cocoa powder | 1.1 |
| Sugar | 12.1 |
| Corn syrup | 1.5 |
| Caramel | 0.6 |
| Chocolate essence | 0.4 |
| Gelatin | 0.2 |
| Water | 75.8 |

TABLE 13

| Soft Capsules | |
|---|---|
| Gelatin | 70.0% |
| Glycerol | 22.9% |
| Methyl paraoxybenzoate | 0.15% |
| Propyl paraoxybenzoate | 0.15% |
| Water | suitable amount |
| Total | 100% |

What is claimed is:

1. A food composition comprising a food and 2 to 8.5% by weight of a diglyceride in which both aliphatic acids of said diglyceride are a $C_{10}$ aliphatic acid.

2. The food composition of claim 1, wherein both aliphatic acids of said diglyceride are capric acid.

3. The food composition of claim 1, which comprises 4.0 to 85% by weight of the diglyceride.

4. The food composition of claim 1, which is in the form of a baked confectionery, fried cake, cake, ice cream, meat, fried food, drink, coffee, tea, vegetable, or bread.

5. The food composition of claim 1, which is in the form of a drink.

* * * * *

UNITED STATES PATENT AND TRADEMARK OFFICE
CERTIFICATE OF CORRECTION

PATENT NO.    : 6,287,624 B1
DATED         : September 11, 2001
INVENTOR(S)   : Hideki Mori et al.

It is certified that error appears in the above-identified patent and that said Letters Patent is hereby corrected as shown below:

<u>Column 10,</u>
Line 22, "8.5%", should read -- 85% --.

Signed and Sealed this

Twenty-second Day of October, 2002

*Attest:*

*Attesting Officer*

JAMES E. ROGAN
*Director of the United States Patent and Trademark Office*